May 17, 1927.

J. F. BRADY ET AL

BALLOON TIRE PATCH

Filed June 23, 1926

1,629,335

Inventors,
J. F. Brady,
R. B. Ott,
By Clarence A O'Brien
Attorney

Patented May 17, 1927.

1,629,335

UNITED STATES PATENT OFFICE.

JOHN F. BRADY AND RICHARD B. OTT, OF RITZVILLE, WASHINGTON.

BALLOON-TIRE PATCH.

Application filed June 23, 1926. Serial No. 118,055.

This invention relates to what is known in the art as a tire patch and it has more particular reference to one which is especially adapted for use in association with low pressure balloon tires devices of this kind being frequently referred to in the trade as repair boots.

More specifically, the invention has reference to a patch which is constructed for disposition between the inner tube and the tire casing for covering a split or crack in the casing.

Our principal aim is to provide a novel patch of this kind which is highly flexible, durable, and substantially ever-wearing.

An equally important object, if not more so than the one stated, is the provision of a repair boot of the kind specified which embodies sufficient raw material that the friction and the heat generated from the travel of the tire over a surface causes the patch to automatically and accurately conform to the tire and tube and to literally become a part thereof. In fact, to virtually self vulcanize itself to the inner surface of the outer casing.

A further object is to provide a patch of this kind which substantially eliminates friction between the inner tube, the boot and the casing, this being accomplished by the use of the different raw substances which are known friction preventers.

A still further object is to provide a boot of this kind which is even very flexible under comparatively low air pressure, thus preventing the tire from being mis-shapen and disturbing the rotary traction effect of the same.

Other objects and advantages of the invention will become apparent from the following description and drawings:—

In the accompanying drawings forming a part of this application, and in which like numerals are employed to designate like parts throughout the same:—

Figure 1:
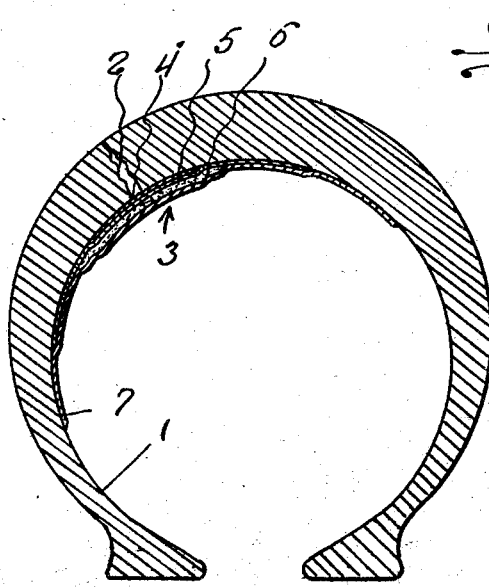
Figure 1 is a transverse section through the tire casing and the improved patch associated with the same at the break.
Figure 2:
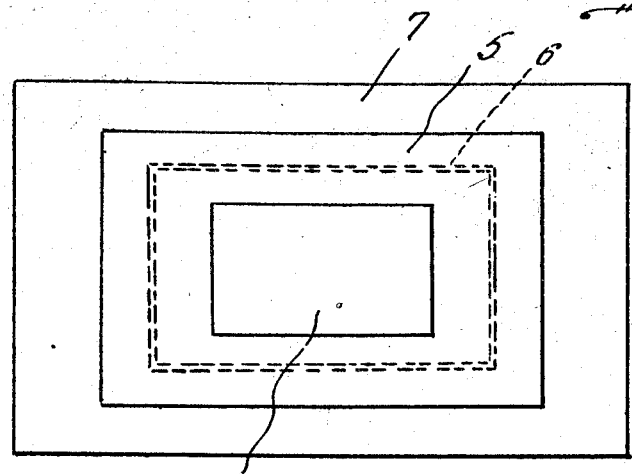
Fig. 2 is a top plan view of the improved patch.
Figure 3:
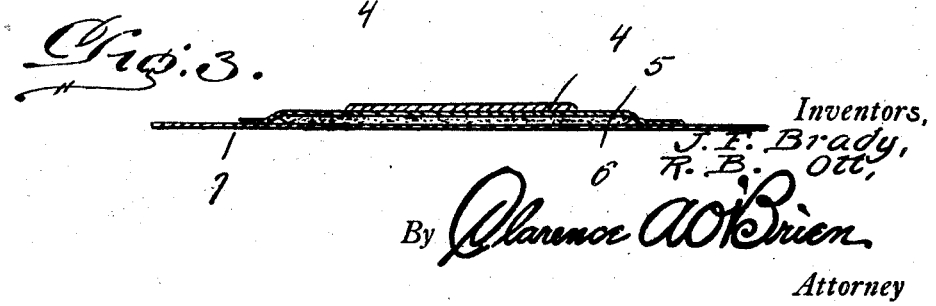
Fig. 3 is a longitudinal section through the patch.

In the drawing, the reference character 1 designates a conventional tire casing such as is used with the well known low pressure balloon tire, the same being here shown as provided with a break 2 caused by a blow-out or from some other cause. The inner tube is not shown. The patch is generally designated by the reference character 3, and it is shown placed over the break to repair the tire and to obtain considerable more mileage than would otherwise be had.

The patch 3 is of laminated construction and it embodies first, a relatively small piece of material designated by the reference character 4. This is of plane tread stock rubber which is used in repairing treads of tires, but as used in this particular boot construction, it is semi-cured to fill the hole or break and to take the road wear just as the tread of the tire would. It keeps sand, water, dirt and road wear from the body of the boot, and it prevents greater wear of the break.

This semi-cured piece of material 4 is connected with a thinner ply 5 which is of rubber fabric or tire building fabric. It is preferably provided with a friction gum on its outer side and is rubberized on the other side. It is made of the usual raw material used in vulcanizing tires, and the friction gum is very sensitive and will adhere to the inside walls of the tire casing.

It will be noted that the ply 5 is of a greater size than the ply 4 and is also of a greater size than the intermediate filler 6. It might be conveniently stated here that the two pieces 4 and 5 are not of sufficient strength to prevent the inner tube from going into and thru the break in the tire, or to prevent undue bulging at this point. For this reason the filler 6 is used, and this is of a dry tanned light-weight and very flexible leather, or in the form of 40 ounce duck. In either instance, the filler is treated with rubber cement in order to connect it to the complemental ply 5 of fabric. In addition to these three pieces of material, there is still a fourth piece which is represented by the reference character 7, and this forms somewhat of a backing member, and is obviously connected both with the filler 6 and the fabric 5.

The outer surface of this backing member which is of a greater size than any of the other pieces, is coated with friction gum and the other side is plane fabric or combination gum.

All of the parts being in overlapping relation and appropriately secured together, and formulated, provides a comparatively flexible patch that readily conforms to the interior wall of the tire casing and also the exterior adjacent surface of the inner tube. The patch forms an exceptionally practical covering for the rupture and automatically works itself into the tire and literally becomes a part thereof. In fact, it is substantially self-vulcanizing to the outer casing under the heat generated by the friction due to the running of the tire. Obviously, this is caused by the raw substances which constitute a part of the patch. The advantage of the patch, however, is that it is substantial and yet sufficiently flexible to permit it to be used practically in connection with a low pressure balloon tire casing, and this is something that has been sought ever since the balloon tire has been in vogue. It has been difficult to get a convenient and practical patch for a rupture in a casing of this kind which would be light in weight, and which would still be strong and yet not materially disturb the normal shape of the tire casing of the rotary action, or to impair traction.

No doubt, by considering the description in connection with the drawings, persons familiar with devices of this kind will be able to obtain a clear understanding of the same. Therefore, a more lengthly description is thought unnecessary. While the preferred embodiment of the invention has been shown and described, it is to be understood that minor changes coming within the field of invention claimed may be resorted to if desired.

Having thus described my invention, what we claim as new is:—

1. A tire patch of the class described embodying a multiplicity of plies of material, the outer one of which is composed of a semi-cured rubber gum or plastic rubber to seal the rupture, the adjacent ply comprising a rubber fabric connected to the outermost ply, the next ply comprising a piece of leather to reinforce the rupture.

2. A tire patch of the class described embodying a multiplicity of plies of material, the outer one of which is composed of a semi-cured rubber gum of plastic rubber to seal the rupture, the adjacent ply comprising a rubber fabric connected to the outermost ply, the next ply comprising a piece of leather to reinforce the rupture, and the remaining ply constituting a backing member and being composed of combination fabric having friction gum on its outer side to hold the patch in place and to cause the entire patch to adhere to the inner surface of the wall of the casing and become literally vulcanized in place.

In testimony whereof we affix our signatures.

JOHN F. BRADY.
RICHARD B. OTT.